3,646,182
METHOD FOR PRODUCING A PLASTIC MATERIAL HAVING IMPROVED FRICTIONAL AND SLIDING PROPERTIES
Alois Wilhelm Ferch, Neuss, Germany, assignor to Werner H. Fengler, Dearborn, Mich.
Filed Apr. 3, 1969, Ser. No. 813,135
Int. Cl. B29d 7/18
U.S. Cl. 264—115                          3 Claims

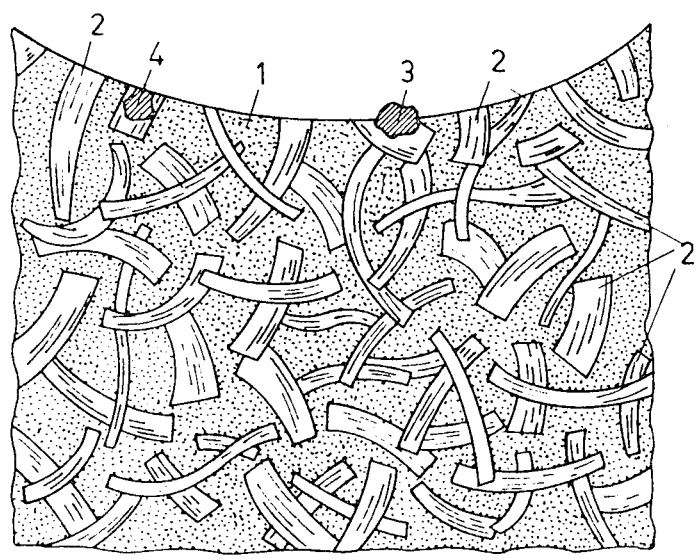

ABSTRACT OF THE DISCLOSURE

An improved plastic anti-friction bearing material is produced by cutting, turning or otherwise subdividing sintered polytetrafluoroethylene plastic material from a solid body thereof, collecting the resilient shavings or chips so produced in a loosely-piled interlock mass thereof with intervening interstices resembling a mass of excelsior, placing this mass in a mold in engagement with the side walls of the mold. A polymerizing liquid mixture suitable for producing a solid polyamide plastic material is then poured into the mold, and thereby filling the interstices between the interlocking shavings or chips of the polytetrafluoroethylene plastic. Although the latter are lighter than the polymerizing liquid mixture, their interlocking engagement with one another and with the side walls of the mold prevent them from floating to the top of the mold, so that the polytetrafluoroethylene chips or shavings become uniformly distributed throughout the interior of the solid polyamide body produced upon polymerization Subsequent removal of the surface layer of this body uncovers the softer polytetrafluoroethylene chips firmly embedded therein.

In subsequent use, as a bearing element, undesired particles of foreign matter such as grit or metal particles merely move a short distance across a polyamide plastic area into the nearest polytetrafluoroethylene plastic area into which they imbed themselves because of the greater softness of the polytetrafluoroethylene plastic, thereby rendering them harmless.

BACKGROUND OF THE INVENTION

Certain materials having improved anti-frictional properties over metals, sometimes called "oilless" or "self-lubricating" materials, are known in this art. Among such plastic materials are those consisting of polyamide plastic material containing molybdenum sulfides from which useful parts are produced, either by casting or machining. Such material has been used for bearings of rotating shafts, in the form of bearing shells or sleeves.

The method of producing well-known plastic materials for such parts consists, generally speaking, of alkaline polymerization. In a specific case, this consists of activating an anionic polymerization of lactam, by heating caprolactam with an activating material and caprylactam with a catalyst material, discharging both materials in their liquid form into a common container, and mixing them with liquids. In a very short time the next mixture hardens under complete absence of any strain (see German Pat. 1,067,-587, Deutsche Auslegeschrift 1,071,946 and French Pat. 1,287,073). The solid block, so produced, can be machined into the desired form.

Such known plastic parts, when used as bearings, possess the fault of wearing out too quickly. This excessive wear is caused, on the one hand, by the heat generated in the bearing by friction, which causes an increased cold flow of the thermoplastic bearing material by which a deformation from the true form of the part, such as a bearing shell, is caused. On the other hand, the excessive wear is caused by foreign particles which have entered between the rotary and the stationary parts of the bearing, and which revolve inside the bearing, through which action they cause grooving of the non-revolving part, and which also scratch and abrade the rotating parts. One example of such foreign particles is the scale or sinter which is found on the rolling mill stands of steel mills, namely the broken bits of the broken-off oxide which occurs through the cooling and rolling action of the rolling mills. This fine dust (sometimes called "sinter") gets into the universal joints and bearings of the drives for the rolling mills and causes destruction of the plastic bearing shells through its cutting and grooving action. This destructive action cannot be eliminated by the use of the presently-known plastic materials for so-called "oilless" or "self-lubricating" bearing shells.

On the other hand, pieces of polytetrafluoroethylene which are not in interlocking engagement with one another and with the mold before pouring in the polymerizing liquid mixture, or which are poured into such a mixture, float to the top surface of that mixture and become concentrated there, leaving the remainder of the mixture devoid of such particles or pieces and therefore incapable of improving the performance of a bearing surface formed in or on such remainder after solidification thereof.

The drawing shows, schematically cross-section through a greatly enlarged portion of a bearing element produced according to the present invention, illustrated as being subjected to the entry of two particles of foreign matter in the course of embedding themselves in the polytetrafluoroethylene plastic chips.

By the method of the present invention there is produced a plastic bearing material which permits bearings to run dry yet which is less sensitive to the development of frictional heat, and which cannot be destroyed by the entry of foreign particles. The possibility of completely excluding foreign particles can never be accomplished, because even the best engineered seals and closures can be damaged, and will then permit foreign particles to enter before such damage is detected. The present invention assumes that foreign particles will enter into the bearing and prevent their causing damage. Great improvement would result if the foreign particles were prevented from participating in the turning action since they therefore could not cause any grooves. This requires that such foreign particles be held stationary during operation, without causing any damage in their stationary positions.

The present invention solves this problem by providing a new plastic bearing material having improved anti-friction sliding properties, which properties are acquired through the special method of producing this material. In carrying out the method of producing this improved anti-friction plastic material, pieces in the form of shreds, chips, fibers or shavings are subdivided by cutting or turning from a block of sintered polytetrafluoroethylene plastic material. These chips or shavings retain the curled state that they acquired while being cut off the block, as in a lathe, and are used as a filler material in a loosely-packed mass resembling a mass of excelsior which is placed in a suitable mold before introducing the alkaline polymerizing plastic material. Consequently, the anionic polymerization of lactam, when poured into the mold or form, produces a shaped part made from polyamide plastic material which is now completely impregnated with evenly-distributed shavings, shreds, chips or pieces of polytetrafluoroethylene material. This part, after being machined to the correct dimensions, will reveal throughout its surfaces, exposed portions of such chips, shreds or shavings. As a result, the surface of the part now possesses an alternating composition of polyamide and polytetrafluoroethylene.

In this manner there is produced a useful plastic material which, evenly distributed throughout its mass, contains small three-dimensional particles of polytetrafluoroethylene (also known by the trade name "Teflon"). Parts made from this material will thus have a surface of whatever character, whether straight, plane, curved, stepped or otherwise formed, which will possess closely-spaced small areas either of polyamide or polytetrafluoroethylene plastic material. This is accomplished by pouring into a loosely-packed mass of shavings, shreds, chips or similar fibers of polytetrafluoroethylene plastic material a polyamide-base liquid, which thereby pervades the entire mass thereof.

If, now, a particle of foreign matter such as iron oxide scale is rubbed under pressure into such a composite surface, it will encounter either a polyamide area or a polytetrafluoroethylene area thereof. If the foreign matter particle first encounters a polyethylene area, it embeds itself into the latter and is imprisoned therein, and through penetration therein it becomes submerged or encased, so that the foreign matter particle is removed from that portion of the surface. If, on the other hand, the foreign matter particle first encounters that portion of the surface formed by the polyamide plastic, it needs to travel only the very short distance of one to three millimeers until it reaches and is caught in the adjacent softer section made of polytetrafluoroethylene plastic material.

The present invention reduces the overall coefficient of friction, which is smaller for the composite surface formed of polyamide and polytetrafluoroethylene plastic material than for a surface made solely of polyamide plastic material. Because of this lower coefficient of friction, frictional heat developed in this material is lower and the cold flow of the material is not induced. In this manner, such deformation of the part is eliminated.

The action of the new plastic material consists not only in the capture of foreign particles and in the reduction of the coefficient of friction, but it has an essentially improved lubricating action insofar as the use of this not quite correct expression for such action is permissible. In any case, the anti-frictional properties of this plastic material, produced under the method of the present invention, are much better than those of previously-known materials. Experiments have shown that a block made from this new material will slide on a plane made of polystyrol plastic material as soon as the plane is tipped 5 degrees from the horizontal. It is conjected that the cause for this action lies in the formation of a very thin film, of the thickness of only a layer of molecules, of polytetrafluoroethylene, through which film a thin border plane is formed, on whose surfaces the two surfaces of the bearing slide without actually touching each other.

In all such instances, in which a grinding action actually takes place in the bearing material, such as by the presence of a very fine surface roughness of a rotating axle, it was found that extremely small amounts of material of polytetrafluoroethylene had been removed from the bearing shell, and that these particles had filled in the roughness of the rotating axle. In so doing, it apparently formed a molecularly thin cover layer around the axle in such a manner that the actual material of the axle, preferably steel, does not slide on the bearing but rather on a film of polytetrafluoroethylene.

It is also essential that the filler material polytetrafluoroethylene, which is used to capture the foreign particles, should not be mixed in its normal state as furnished commercially in a fine or coarse powder, but introduced in the form of shavings, chips or fibers. Such larger pieces possess a spring-like resistance by retaining the curled shape which they acquired during cutting. In this manner, the much lighter polytetrafluoroethylene does not rise to the surface of the still-liquid polymerizing mixture but each chip rubs against the walls of the mixing container as well as against the others so as to interlock in an excelsior-like mass such as old-time lock washers used to do. Webster's New International Dictionary, second edition,, 1944, published by the G and C Merriam Company, Springfield, Mass., on page 888 defines this as follows: "excelsior, n. A material of curled shreds of wood used for stuffing upholstered furniture, for packing, etc." As a result, the chips which have been placed in the lower portion of the container or mold remain there, even though the tendency for them to rise by their buoyance is greater at that location. For this reason, the container or mold can be filled uniformly with the shavings or chips of the filler material, which remain substantially uniformly distributed throughout the interior.

The foregoing is also valid in the opposite sense, namely for the use of polytetrafluoroethylene to which has been added a filler to make it heavier than the liquid polymerizing mixture and which would therefore normally sink to the bottom of the container or mold used for carrying out the reaction. Such heavier polytetrafluoroethylene can be produced when during its production a heavy type of filler is added, for example litharge (PbO).

According to a modification of the present method of producing the material under this invention, the chips, shavings, shreds or fibers of polytetrafluoroethylene, before being placed in the mold or container, are cut or ground to a smaller size. Through this means the distribution of the two plastic materials can be made more uniform, and the amount of the alternatively changing surface textures can consequently be increased.

The most advantageous size for the filler material made of polytetrafluoroethylene has been found to be chips or fibers of the following dimensions: one to three mm. wide, approximately one-half mm. thick and up to about fifteen mm. in length.

In regard to the production it is finally advantageous, if, according to another modification of this invention, the operation of uncovering the embedded pieces of the polytetrafluoroethylene filler materials is combined with the operation of shaping the workpiece to the desired form. For example, in the case of a bearing shell, this can be accomplished by causing the planning, turning or boring operations to simultaneously uncover the pieces of the filler material while shaping the workpiece itself.

In summarizing, the production method of this invention, as shown above, results in a formed workpiece with improved anti-frictional and sliding properties, which workpiece consists of a polyamide plastic body having distributed comparatively uniformly throughout its volume chiplike pieces of polytetrafluoroethylene which are also exposed in the same proportion in the surface of the workpiece. The pieces made of polytetrafluoroethylene are preferably about one to three mm. wide, approximately one-half mm. thick and up to about fifteen mm. long. The workpiece when used as a machine element for bearing purposes, besides possessing the optimum anti-frictional sliding properties, possesses the additional advantage of confining and, after a very short travel, encapsulating all such foreign particles as may have found their way into the interior of the bearing.

According to a still further modification of this invention, the pieces of polytetrafluoroethylene are disposed nearer one surface of the composite plastic body than to an opposite surface. This modification is preferably used for such parts which are originally cast into the desired form and which require, for finishing, only the removal, through machining, of a relatively thin surface layer in order to uncover the embedded chips of polytetrafluoroethylene. Even though there is a saving of filler material with this modification, and it provides a solid and much harder core for the formed part, the saving in the cost of the filler material may be offset by the increased expense of the additional procedures necessary to embed chips or the filler material solely in a layer or zone near the surface of the workpiece.

Finally, the method of this invention is useful for the production of skis and sledge runners. The technical values of the coefficients of friction for such sliding motions are superior to those of any presently used materials.

The drawing shows, schematically, a cross-section through a greatly enlarged portion of a bearing shell, which shows the nature of the plastic material produced under the method of this invention, and having improved anti-frictional sliding properties. The mass of the formed part consists of a mixture of small areas of polyamide plastic designated with the numeral 1 and of polytetrafluoroethylene plastic designated with the numeral 2. At the curved surface of the bearing shell a foreign body is shown designated with the numeral 3, which has partially broken into the body of an area of polytetrafluoroethylene 2. In another section is shown a foreign body 4, which body is completely submerged and encapsulated.

The production of the plastic material under this invention, again only described as an example, takes place in two parallel-occurring operations, namely the production of the starting material for a lactam-polymerization mixture and the production of chips or cuttings of polytetrafluoroethylene. The method of producing the polymerization mixture of the starting materials is known and is patented, as mentioned in the preamble. For the production of chips or cutitngs used as the filler material for the polymerization mixture, the commercially available polytetrafluoroethylene in powdered form is heated under pressure in a press, and sintered into a solid block. The block, through a cutting action (preferably through turning on a lathe) is transformed into chips, which appear like excelsior made from wood, and which possess certain spring-like properties or have the power of returning to their previously occupied position. These chips are then reduced in length through a grinding or cutting action, so that shallow bent chips in the previously-mentioned size are formed. Even these cuttings still have the resilient power so that, during the filling of the form used for the final reaction, they interlock among themselves as well as against the side wall of the vessel and thereby form a loose mass provided with many interstices and yet forming such a self-sustaining conglomerate that will not rise to the surface when the water-like starting material of the polymerization mixture is poured into the container in which the polymerization is to be completed. Three components are mixed to form the new plastic material: namely, caprolactam plus activating material, capryllactam plus catalyst, and polytetrfluoroethylene cuttings as a filler. The elastic properties of the filler prevent it rising to the surface; on the contrary the chips fill the whole vessel uniformly from the bottom to the top, and the intermediate voids are filled with the polyamide plastic material. Because the hardening of the polymerization mixture takes place very quickly, a block of the new material according to this invention is produced corresponding to the shape of the vessel.

The block is now finished through applicable machining to the desired form, for example into the form of a bearing shell or a piston. By the machining operation numerous chips of polytetrafluoroethylene are uncovered, so that the finished surface of the formed part presents a uniform mixture of areas of polyamide and of polytetrafluoroethylene plastic. The first-named material is hard and has a great resistance to penetration, whereas the last-named material is soft and easily permits the penetration of any foreign particles.

To produce slideways, for example, for packing machines, for sledge runners or skis, it is required that the reaction vessel have the corresponding shape in order that the polymerization of the materials occurs in the desired final dimensions for the desired products. Only in this manner is a material produced having inherent stresses and which, therefore, can have the required resistance to bending moments as needed for skiers. A very light after-working of the surface ensures the uncovering of numerous pieces of the filler material, according to the method of manufacture.

The characteristics of the subject matter of the application disclosed in the foregoing specification, in the drawing and in the following patent claims can as well be achieved singly or in desired combinations for the realization of the invention its different forms of execution.

I claim:
1. A method for producing a composite body of plastic anti-friction bearing material, comprising
   (a) subdividing sintered polytetrafluoroethylene to form resilient elongated curled pieces as shavings, chips or fibers interlocked with one another into a loosely packed mass having interstices therein,
   (b) placing said mass of elongated interlocked pieces into a mold having side walls, wherein elongated pieces of said mass interlock against said side wall of said mold,
   (c) flowing a hardenable polymerizable liquid polyamide plastic into said mold to embed said mass of elongated pieces therein, said mass remaining in place in said mold by said interlocking of said pieces with one another and against said side walls of said mold, and
   (d) hardening said liquid polyamide plastic to form a solid composite plastic body with said elongated pieces disposed throughout said body.

2. A method, according to claim 1 wherein said mass of elongated pieces is disposed nearer one surface of said composite body than to an opposite surface thereof.

3. A method, according to claim 1, wherein said liquid polyamide plastic comprises a mixture of polymeric plastic ingredients and wherein said hardening involves polymerization of said ingredients.

References Cited
UNITED STATES PATENTS

| 2,998,397 | 8/1961 | Riesing | 264—117 |
| 3,230,187 | 1/1966 | Oldham | 264—118 |
| 3,313,872 | 4/1967 | Hawkes et al. | 264—118 |

ROBERT F. WHITE, Primary Examiner

J. R. HALL, Assistant Examiner

U.S. Cl. X.R.

264—118, 127